United States Patent
Alfi et al.

(10) Patent No.: US 11,796,706 B2
(45) Date of Patent: Oct. 24, 2023

(54) SYSTEM AND METHOD FOR APPLICATION OF ELASTIC PROPERTY CONSTRAINTS TO PETRO-ELASTIC SUBSURFACE RESERVOIR MODELING

(71) Applicant: Landmark Graphic Corporation, Houston, TX (US)

(72) Inventors: Masoud Alfi, College Station, TX (US); Travis St. George Ramsay, Hockley, TX (US)

(73) Assignee: Landmark Graphics Corporation, Houston, TX (US)

( * ) Notice: Subject to any disclaimer, the term of this patent is extended or adjusted under 35 U.S.C. 154(b) by 450 days.

(21) Appl. No.: 17/045,042

(22) PCT Filed: May 8, 2018

(86) PCT No.: PCT/US2018/031570
§ 371 (c)(1),
(2) Date: Oct. 2, 2020

(87) PCT Pub. No.: WO2019/216886
PCT Pub. Date: Nov. 14, 2019

(65) Prior Publication Data
US 2021/0149070 A1  May 20, 2021

(51) Int. Cl.
| | |
|---|---|
| G01V 1/52 | (2006.01) |
| E21B 47/12 | (2012.01) |
| G01V 1/50 | (2006.01) |

(52) U.S. Cl.
CPC ............... *G01V 1/52* (2013.01); *E21B 47/12* (2013.01); *G01V 1/50* (2013.01);
(Continued)

(58) Field of Classification Search
CPC . G01V 1/52; G01V 1/50; G01V 1/306; G01V 1/42; G01V 2210/16;
(Continued)

(56) References Cited

U.S. PATENT DOCUMENTS

| | | | |
|---|---|---|---|
| 6,058,073 A | 5/2000 | VerWest | |
| 7,480,663 B2 | 1/2009 | Colossi et al. | |

(Continued)

FOREIGN PATENT DOCUMENTS

| | | |
|---|---|---|
| CN | 103399849 A | 11/2013 |
| EP | 3171203 A1 | 5/2017 |

(Continued)

OTHER PUBLICATIONS

Addison et al., Developing a Robust Geologic Conceptual Model Using Pseudo 3-D P-Wave Seismic Reflection Data, Mar. 2009, Environmental Geosciences, vol. 16, No. 1, 17 pp. (Year: 2009).*

(Continued)

*Primary Examiner* — Toan M Le
(74) *Attorney, Agent, or Firm* — Kilpatrick Townsend & Stockton LLP

(57) ABSTRACT

An information processing system having a processor and a memory device coupled to the processor, wherein the memory device includes a set of instruction that, when executed by the processor, cause the processor to receive a multi-dimensional grid of acoustic or elastic impedances determined from seismic survey data associated with a subterranean formation, receive elastic property data that describes elastic property characteristics used to sort pseudo-components, and wherein the respective pseudo-components are formed of a combination of two or more lithologies. The instructions, when executed by the processor, further cause the processor to define select design variables using the impedance arrays, perform optimization
(Continued)

operations for optimizing select design variables by applying the elastic property data as a part of a constitutive relation, and output a distribution of the pseudo-components to characterize volumetric concentrations of spatially grouped lithologies in a control volume of the subterranean formation.

20 Claims, 6 Drawing Sheets

(52) U.S. Cl.
CPC .................. *G01V 2210/161* (2013.01); *G01V 2210/6224* (2013.01); *G01V 2210/6226* (2013.01); *G01V 2210/66* (2013.01)

(58) Field of Classification Search
CPC ... G01V 2210/6224; G01V 2210/6226; G01V 2210/66; G01V 2210/616; G01V 2210/6169; G01V 2210/6244; G01V 2210/665; G01V 2210/121; G01V 2210/1293; G01V 2210/1295; G01V 2210/1429; G01V 2210/614; G01V 2210/6242; G01V 2210/6246; G01V 2210/161; E21B 47/12

See application file for complete search history.

(56) References Cited

U.S. PATENT DOCUMENTS

| | | |
|---|---|---|
| 9,041,548 B2 | 5/2015 | Portocalis et al. |
| 2007/0280048 A1 | 12/2007 | Dubinsky et al. |
| 2011/0267921 A1 | 11/2011 | Mortel et al. |
| 2012/0035893 A1 | 2/2012 | Liu et al. |

FOREIGN PATENT DOCUMENTS

| | | |
|---|---|---|
| WO | WO-2009114941 A1 | 9/2009 |
| WO | WO-2017019388 A1 | 2/2017 |

OTHER PUBLICATIONS

Fernandez Martinez et al., Reservoir Characterization and Inversion Uncertainty Via A Family of Particle Swarm Optimizers, Jan.-Feb. 2012, Geophysics, vol. 77, No. 1, pp. M1-M16 (Year: 2012).*
International Search Report and Written Opinion for PCT Application No. PCT/US2018/031570, dated Feb. 12, 2019.

* cited by examiner

SYSTEM AND METHOD FOR APPLICATION OF ELASTIC PROPERTY CONSTRAINTS TO PETRO-ELASTIC SUBSURFACE RESERVOIR MODELING

CROSS-REFERENCE TO RELATED APPLICATIONS

This application is a 371 U.S. National Phase of International PCT Patent Application No. PCT/US2018/031570, filed on May 8, 2018, the content of which is expressly incorporated herein by reference in its entirety.

TECHNICAL FIELD OF THE INVENTION

The embodiments disclosed herein generally relate to subsurface reservoir modeling and, more particularly, to methods of applying elastic property constraints to model a distribution of pseudo-components.

BACKGROUND OF THE INVENTION

Hydrocarbons, such as oil and gas, are commonly obtained from subterranean formations that may be located onshore or offshore. The development of subterranean operations and processes involved in removing hydrocarbons from a subterranean formation are complex. Typically, subterranean operations involve a number of different steps such as, for example, selecting a location for a wellbore through and/or into a subterranean formation, planning parameters of drilling and treating of the wellbore, drilling the wellbore at the selected location, treating the wellbore to optimize production of hydrocarbons, and performing steps to produce and process the hydrocarbons from the subterranean formation. The selection of the location of the wellbore and planning parameters for drilling and treating the wellbore can be performed based on a model of a corresponding subsurface reservoir.

However, there can be uncertainty or unavailability of data and information sought, including geological, petrophysical, hydraulic, elastic properties and depositional characteristics. Sources for this information can include outcrop analysis, core data, seismic surveys, and well logging analysis.

Of particular interest are elastic properties of the well reservoir. Determination of the elastic properties can be illusive without detailed information about the lithology of the reservoir. However, this detailed information is difficult to obtain.

The ability to determine elastic properties of a well reservoir is of direct relevance to hydrocarbon removal from subterranean formations of the well reservoir, which is particularly challenging when only limited data about the subterranean formations is available. Accordingly, there is continued interest in the development of improved reservoir modeling that can compensate for unavailable information to provide information about elastic properties of the well reservoir.

BRIEF DESCRIPTION OF THE SEVERAL VIEWS OF THE DRAWING

For a more complete understanding of the disclosed embodiments, and for further advantages thereof, reference is now made to the following description taken in conjunction with the accompanying drawings in which.

DETAILED DESCRIPTION OF THE DISCLOSED EMBODIMENTS

Figure 1:
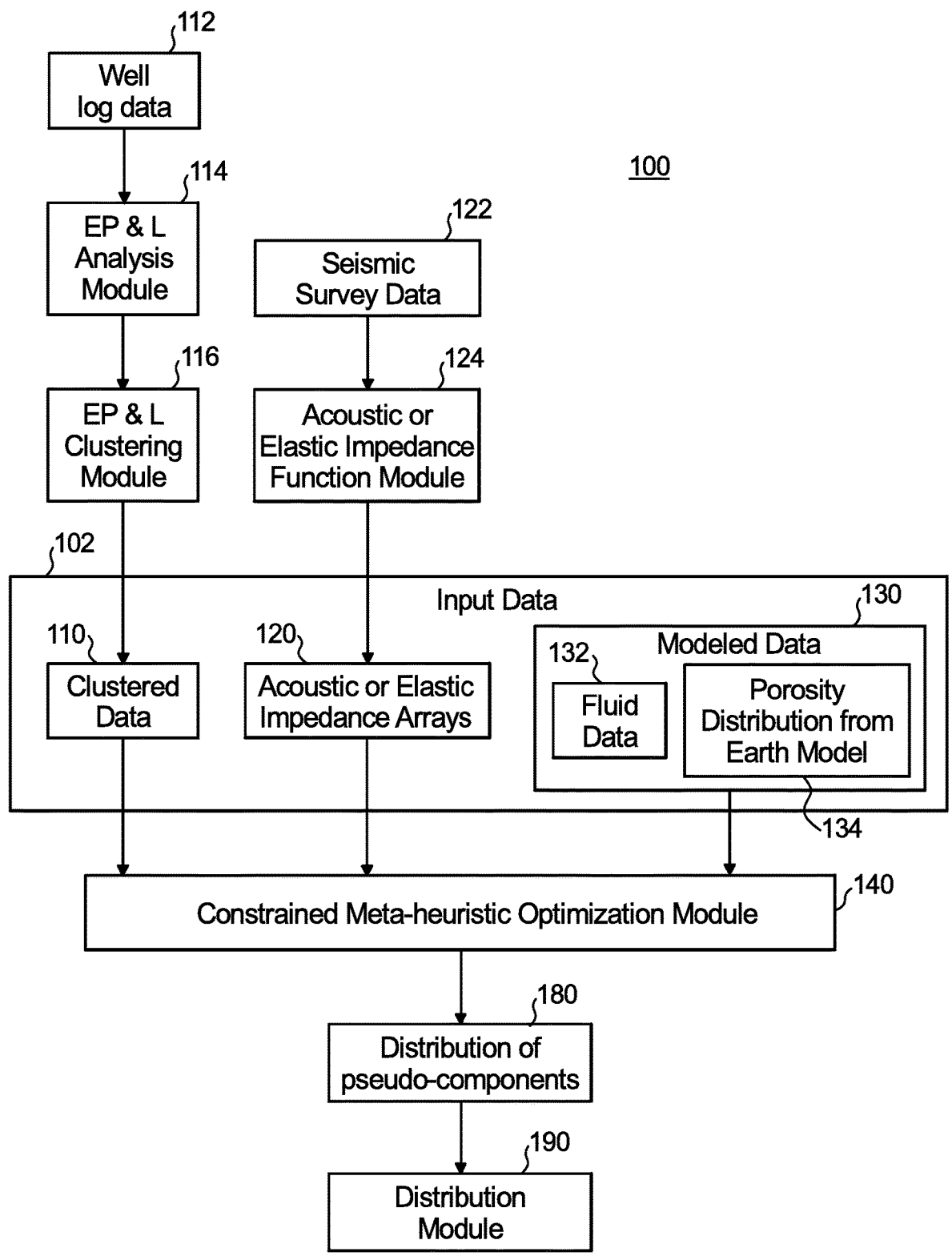
FIG. 1 is a block diagram of an example reservoir modeling system, in accordance with embodiments of the present disclosure.

The following discussion is presented to enable a person skilled in the art to make and use the invention. Various modifications will be readily apparent to those skilled in the art, and the general principles described herein may be applied to embodiments and applications other than those detailed below without departing from the spirit and scope of the disclosed embodiments as defined herein. The disclosed embodiments are not intended to be limited to the particular embodiments shown, but are to be accorded the widest scope consistent with the principles and features disclosed herein.

The terms "couple" or "coupled" as used herein are intended to mean either an indirect or a direct connection. Thus, if a first device couples to a second device, that connection may be through a direct connection, or through an indirect electrical or mechanical connection via other devices and connections. The term "uphole" as used herein means along a drill string or a hole from a distal end towards the surface, and "downhole" as used herein means along the drill string or the hole from the surface towards the distal end.

It will be understood that the term "oil well drilling equipment" is not intended to limit the use of the equipment and processes described with those terms to drilling an oil well. The terms also encompass drilling natural gas wells or hydrocarbon wells in general. Further, such wells can be used for production, monitoring, or injection in relation to recovery of hydrocarbons or other materials from a subsurface. This could also include geothermal wells intended to provide a source of heat energy instead of hydrocarbons.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or one or more embodiments combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

For purposes of this disclosure, an information processing system may include any device or assembly of devices operable to compute, classify, process, transmit, receive, retrieve, originate, switch, store, display, manifest, detect, record, reproduce, handle, or utilize any form of information, intelligence, or data for business, scientific, control, or other purposes. Examples of well-known computing systems, environments, and/or configurations that may be suitable for use with the information processing system include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices or any other suitable device that may vary in size, shape, performance, functionality, and price.

The information processing system may include a variety of computer system readable media. Such media may be any available media that is accessible by the information processing system, and it includes both volatile and non-volatile media, removable and non-removable media. The information processing system can include computer system readable media in the form of volatile memory, such as random access memory (RAM) and/or cache memory. The information processing system may further include other removable/non-removable, volatile/non-volatile computer system storage media, one or more processing resources such as a central processing unit ("CPU") or hardware or software control logic, and/or ROM. Additional components of the information processing system may include one or more network ports for communication with external devices as well as various input and output ("I/O") devices, such as a keyboard, a mouse, and a video display.

The information processing system may also include one or more buses operable to transmit communications between the various hardware components. A first device may be communicatively coupled to a second device if it is connected to the second device through a wired or wireless communication network which permits the transmission of information.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Reference will now be made to the drawings wherein like reference numerals identify similar structural features or aspects of the subject disclosure. For purposes of explanation and illustration, and not limitation, a block diagram of an exemplary embodiment of a reservoir modeling system for modeling a distribution of pseudo-components of a subsurface of a reservoir in accordance with the disclosure is shown in FIG. 1 and is designated generally by reference character 100. Embodiments of aspects of the reservoir modeling system 100 in accordance with the disclosure are provided in FIGS. 2A-5, as will be described.

With reference to FIG. 1, the reservoir modeling system 100 includes a constrained meta-heuristic optimization module 140 (also referred to as optimization module 140) for providing a distribution of elastic pseudo-components of a subterranean formation that has a reservoir formed therein. The optimization module 140 receives input data 102, including at least one of clustered data 110, one or more arrays of input acoustic or elastic impedances 120, and modeled data 130. The optimization 140 performs constrained meta-heuristic optimization operations on the input data to output a distribution of pseudo-components 180 to characterize volumetric concentrations of lithologies in a control volume of the subterranean formation. A distribution module 190 can operate on the distribution of pseudo components, such as to apply the distribution of pseudo components to applications, such as for simulation of pre-supporting excavation and/or well location optimization, as described in greater detail with respect to FIG. 5. The control volume is a mathematical abstraction that can be used to create a mathematical model of the subterranean formation.

The clustered data 110 is based upon an analysis of well log data 112. The well log data 112 includes measurements that provide an evaluation of the subterranean rock formation in the vicinity of a wellbore and its fluid content. The measurements, which can be open-hole and/or cased-hole measurements, can be obtained using sensors or receivers provided at different locations along the length of the wellbore. The well log data 112 can reflect characteristics arising from natural (or spontaneous) phenomena, and also those arising from induced phenomena. Natural phenomena can include, for example, natural gamma radioactivity, spontaneous potential, and formation temperature. Induced phenomena can include, for example, electrical measurements obtained in response to emission into the wellbore of an electrical signal, nuclear measurements obtained in response to irradiation of the subterranean formation with gamma rays or neutrons, hole-diameter of the wellbore, inclination of the hole, and/or acoustic measurements (seismic acquisition or sonic log obtained in response to an acoustic signal emitted into the formation.

The elastic properties and lithology (EP & L) analysis module 114 analyzes the well log data 112 to determine lithologies and elastic properties of the well log data 112. More particularly, well log data 112 includes elastic and petrophysical properties that have been measured. Based on the range of measured values, the types of lithologies can be determined. For example, the well log data 112 can be used to detect the presence of sand, shale, dolomite, etc. The EP & L clustering function 116 applies a clustering algorithm (or a plot in a cross plot) to detect clusters of lithologies in the well log data 112 by clustering the well log data 112 based on its elastic properties. Examples of clustering algorithms include rich neighbors matrix partitioning (such as described in commonly-assigned U.S. Patent Publication Number 20170323036, which is incorporated herein), hierarchical clustering, centroid based clustering, and density based clustering.

The clustered lithologies, also referred to as pseudo-components, are output as clustered data 110. Conventionally, lithologies are grouped based on porosity and/or permeability. However, lithologies that have similar porosity and/or permeability values can exhibit different elastic properties. Accordingly, the clustering of the well log data 112 based on their elastic properties into groups can result in lithologies that have similar porosity and/or permeability being clustered into different pseudo-components based on their elastic properties. The clustering can use information about shear modulus and/or bulk modulus. Shear modulus is defined as the ratio of shear stress to shear strain. Bulk modulus is defined as a measure of resistance to compressibility, which can be measured as the ratio of an infinitesimal pressure increase to a resulting relative decrease of volume.

Shear modulus and bulk modulus measurements can be obtained by mechanical lab testing; however, in embodiments, these properties are based on referenced descriptions of lithology, which are computed into pseudo-components to confirm the in-situ lithological description for a grid block of a three-dimensional grid. The information about shear or bulk modulus in this case can be used to constrain the optimization process if it is available. If this data is not available, the pseudo-components can be determined stochastically. The shear or bulk modulus can be saturated, meaning it is filled with formation fluids.

The input acoustic or elastic impedance arrays 120 are based on seismic survey data 122 obtained by a seismic survey. The seismic survey can be performed using one or more seismic sources that apply acoustic stimulations at different locations of the surface of a formation, and a plurality of seismic receivers that sense reflected seismic waves. The seismic source(s) can be provided, for example, at the surface of a subterranean formation or, for offshore applications, in water above a subterranean formation. These seismic sources can be, for example, point sources that apply seismic energy, which can be P (compression) and/or S (shear) waves. The seismic receivers can be provided at different locations of the surface of a subterranean formation or, for offshore applications, at different locations in water above a subterranean formation, and/or at different depth locations along the length of a wellbore formed in the subterranean formation. The seismic survey data 122 can thus provide three-dimensional information about the formation being surveyed. Seismic surveys performed at different points in time provide four-dimensional information.

Seismic survey data 122 output by the receivers is processed by an acoustic or elastic impedance function 124 to determine acoustic impedance or elastic impedance. The acoustic or elastic impedance represents the product of density and seismic velocity, which varies among different rock layers, wherein the difference in impedance (which refers to acoustic or elastic impedance, unless specified otherwise) between rock layers affects a reflection coefficient. Elastic impedance is obtained by acquiring seismic data of non-zero angles of incidence. Acoustic impedance represents elastic impedance at zero degree angle of incidence. The acoustic or elastic impedance function 124 can apply a seismic inversion and/or an interpretation to the seismic survey data 122 to calculate the impedance of the subterranean formation. Seismic inversion is a process of transforming the seismic survey data 122 into a quantitative rock-property description of a reservoir through a deconvolution process. Seismic inversion, which can be used to relate seismic survey data 122 into a rock formation property, may be performed pre- or post-stack, and may be deterministic, random, or geostatistical.

The input acoustic or elastic impedance arrays 120 include data that characterizes impedance of a subterranean formation of interest. Each input acoustic or elastic impedance array 120 can be described as a multi-dimensional grid of acoustic or elastic impedances that corresponds to the spatial dimensions of the formation and/or to a time dimension. Each grid block of the grid is described by a single rock property value reflecting the acoustic or elastic impedances.

The modeled data 130 can include models, such as a reservoir fluid model 132 and/or a porosity distribution from an earth model. Reservoir fluid model 132 can include, for example, modeled data about fluid saturations, pressure, temperature, densities, bulk modulus, and/or shear modulus of fluid in a reservoir in the subterranean formation. The modeled data 130 can be obtained from actual samples of the subterranean formation, or can be calculated from data that is available, such as well logs of the subterranean formation or representative estimations of properties of the subterranean formation based on reference values.

Figure 2A:
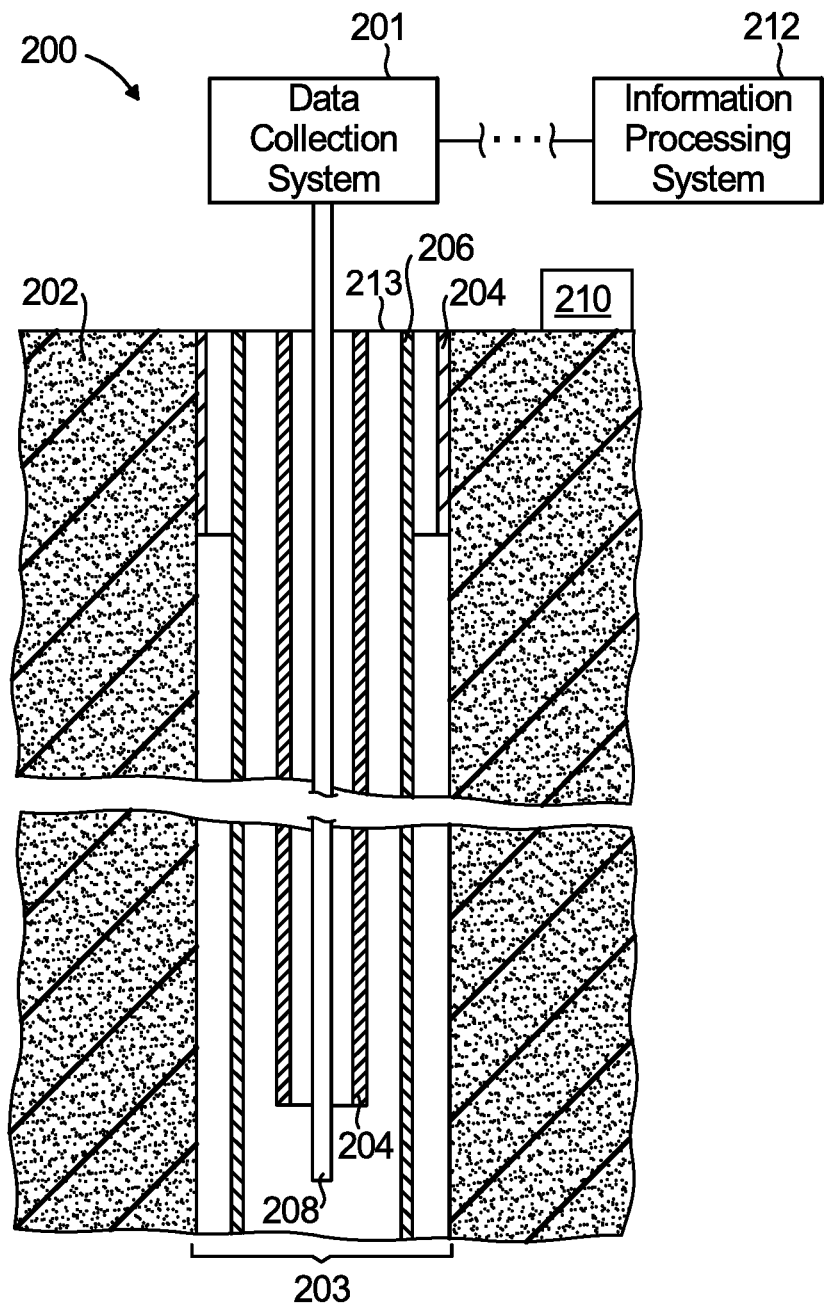
FIG. 2A is a schematic diagram illustrating an example fiber-optic based distributed acoustic sensing (DAS) vertical seismic profiling (VSP) system deployed in a wellbore according to the disclosed embodiments.
Figure 2B:
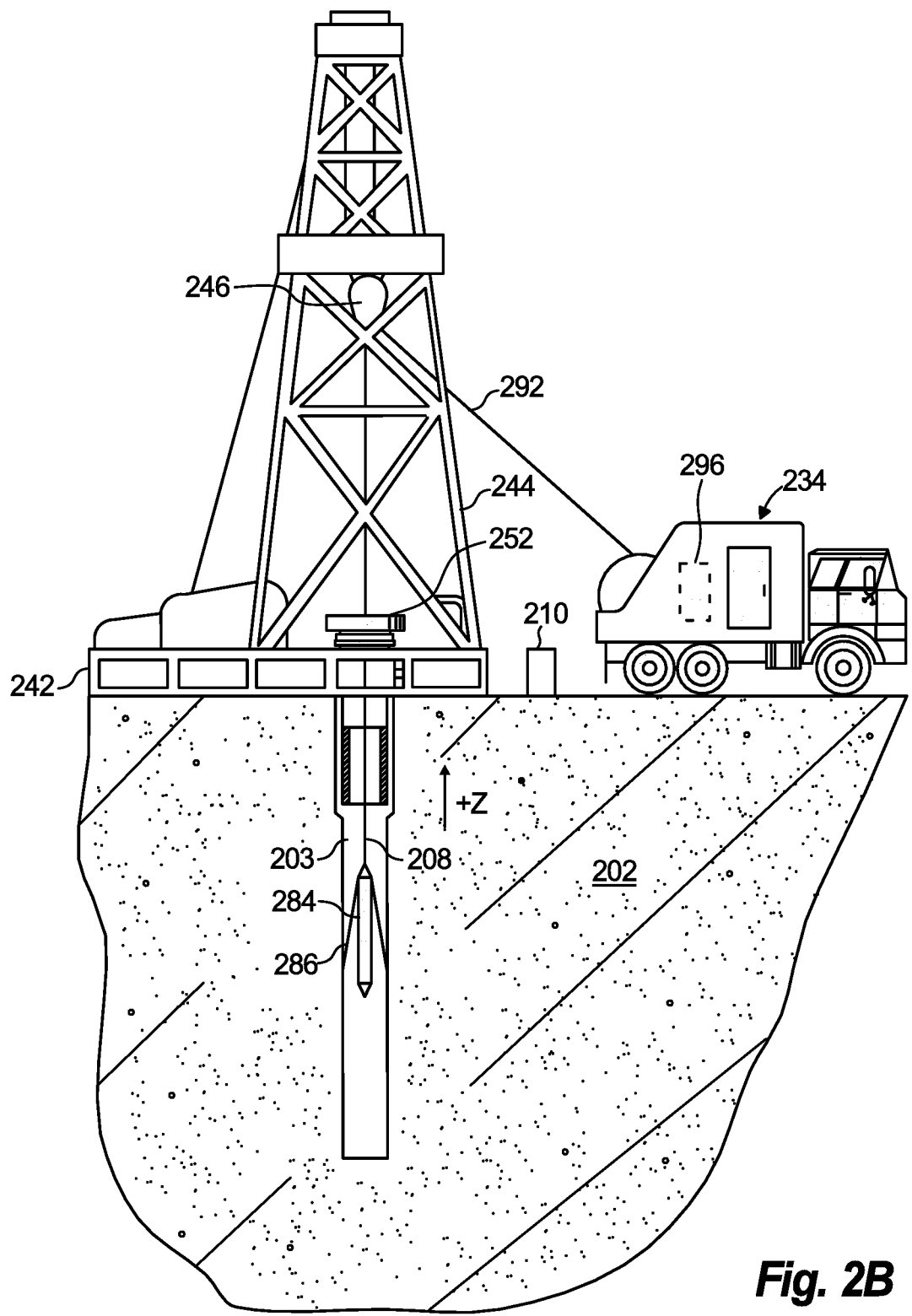
FIG. 2B is a schematic diagram that illustrates an example wireline logging environment.

FIGS. 2A and 2B show illustrative examples of a DAS VSP system 200 that can be used to perform a seismic survey, such as the seismic survey 122 shown in FIG. 1, and obtain seismic survey data according to the disclosed embodiments. Embodiments of the present disclosure may be applicable to horizontal, vertical, deviated, multilateral, u-tube connection, intersection, bypass (drill around a mid-depth stuck object and back into the wellbore below), or otherwise nonlinear wellbores in any type of subterranean formation. Certain embodiments may be applicable to, for example, wired drill pipe, coiled tubing (wired and unwired), logging data acquired with wireline, and slickline. Certain embodiments may be applicable to subsea and/or deep sea wellbores. Embodiments described below with respect to one implementation are not intended to be limiting.

Vertical seismic profiling (VSP) may refer to measurement of seismic/acoustic energy in a wellbore originating from a seismic source at a surface of the wellbore (e.g., a vibrator truck, air gun, and/or explosives). In embodiments, the measurements can be recorded by using a string of approximately equally spaced geophones and/or hydrophones. In other embodiments, the measurements can be recorded using distributed acoustic sensing (DAS) techniques. In DAS VSP collection methods, a fiber optic cable having one or more optical fibers deployed in a wellbore is used in place of the geophones or hydrophones to obtain the measurements. The fiber optic cable may be, for example, cemented into the wellbore wall behind tubulars (e.g., production tubing) or casing, or be temporarily placed in the wellbore (e.g., inside a retrievable wireline or slickline logging cable or via coiled tubing) either with a drill string in place or removed from the wellbore. Although a DAS VSP system 200 is illustrated in FIGS. 2A, 2B, the disclosure is not limited to a VSP configuration.

The example DAS VSP system 200 may be deployed in association with a wellbore 203. The DAS VSP system 200 may include, among other things, a DAS data collection system 201 coupled to an optical fiber 208, the optical fiber being at least partially positioned within the wellbore 203 formed in a subterranean formation 202. One or more tubulars 204 may be positioned within the wellbore 203, e.g., in a telescopic fashion. The disclosure is not limited to a particular configuration of the one or more tubulars 204 within the wellbore 203. As understood by those skilled in the art, the optical fiber 208 can include one or more optical fibers. In various embodiments, optical fiber 208 can be positioned, for example, by being hung in the wellbore 203, latched on to the one or more tubulars 204, or cemented behind a casing 206, such as to couple to the formation 202.

It should be noted that any suitable number of DAS VSP systems 200 (each having a different optical fiber 208 at least partially located downhole) may be placed adjacent to wellbore 203. With optical fiber 208 positioned inside a portion of wellbore 203, the DAS VSP system 200 may receive or otherwise obtain seismic survey data based on disturbances caused by a seismic source set 210. In one embodiment, the seismic source set 210 includes multiple seismic sources arranged in a specific configuration optimized to create seismic waves in formation 202 as required herein. The seismic sources may include, for example, but are not limited to, vibrators, air guns, weight drops, accelerated weight drops, marine vibrators, mortar gun explosives (e.g., dynamite), thumper trucks, or any other suitable vibration source for creating seismic waves in formation 202. The source set 210 can include, for example, a vertically oriented P wave and/or horizontally oriented S wave sources.

The seismic survey data may correspond to changes in strain or strain rate (in this disclosure collectively referred to as strain) in the optical fiber 208 that are identified by detecting phase changes in backscattered light signals along a length of the optical fiber 208.

An information processing system 212 can be communicably coupled to the DAS data collection system 201 through, for instance, a wired or wireless connection. The information processing system 212 can be coupled to multiple DAS data collection systems 201 of one or more respective DAS VSP systems 200. The information processing system 212 may receive measurement in the form of a seismic survey dataset from the DAS data collection systems 201 and perform one or more actions that will be described in detail below. The information processing system 212 may be located on-site, remotely, or a portion of the system 212 may be on-site and a portion located remotely. Additionally, the information processing system 212 may receive a seismic survey dataset from a data center or storage server in which the seismic survey data received or otherwise acquired by the DAS data collection systems 201 were previously stored.

Modifications, additions, or omissions may be made to FIG. 2A without departing from the scope of the present disclosure. For example, the DAS data collection system 201 and optical fiber 208 may be used during wireline or slickline logging operations before some or all the tubulars 204 have been secured within the wellbore 203, and/or before the wellbore 203 is completed. Moreover, components may be added to or removed from the DAS VSP system 200 without departing from the scope of the present disclosure.

FIG. 2B shows an exemplary operation of the disclosed systems and methods in which a wireline configuration is used for logging. Logging operations can be conducted using a wireline logging tool 284, e.g., a sonde sensing instrument, suspended by a cable 292. The cable 292 includes optical fiber 208, a portion of which is positioned within the wellbore 203. Cable 292 can further include conductors for transporting power to the tool 284 and/or communications from the tool 284 to instruments at the surface 213 (FIG. 2A) of the wellbore 203. Seismic source set 210 is positioned at the surface 213 of the formation 202. A logging portion of the wireline logging tool 284 may have centralizing arms 286 that center the tool 284 within the wellbore 203 as the tool 284 is pulled uphole. An optional logging facility 234 collects measurements from the wireline logging tool 284, and can include information processing system 212 (FIG. 2A) for processing and storing the measurements gathered by the wireline logging tool 284.

Figure 3:
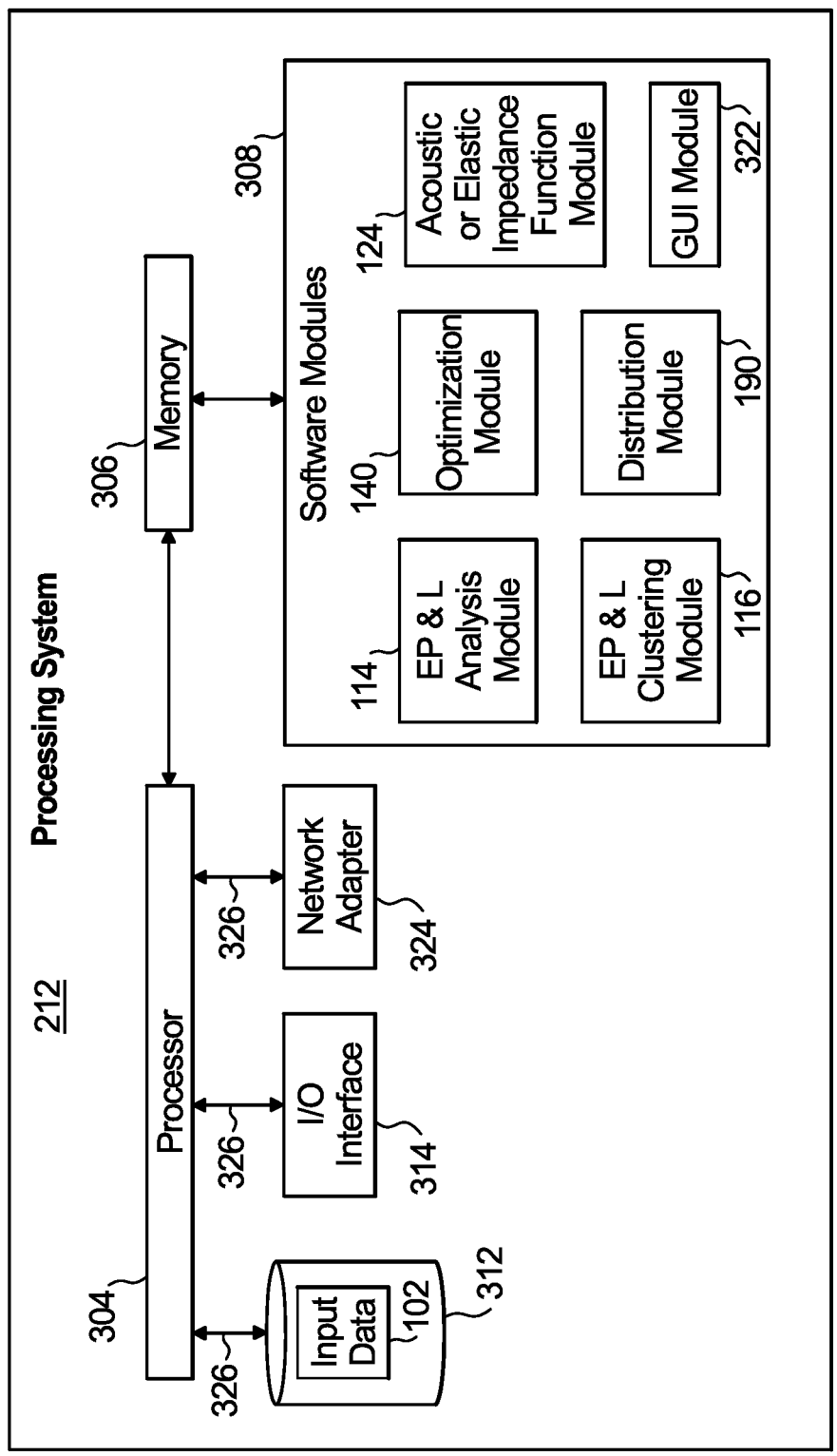
FIG. 3 is a block diagram illustrating an example computer processing system, in accordance with embodiments of the present disclosure.

FIG. 3 illustrates a block diagram of an example embodiment of the information processing system 212 from FIG. 2A, in accordance with embodiments of the present disclosure. The information processing system 212 includes at least one processor 304, at least one memory 306, and can further include an I/O interface 314 and a network adapter 324. The components of the information processing system 212 can be coupled by one or more buses 326. Each processor 304 may include, for example a microprocessor, microcontroller, digital signal processor (DSP), application specific integrated circuit (ASIC), or any other digital or analog circuitry configured to interpret and/or execute program instructions and/or process data. As depicted, each processor 304 is communicatively coupled to at least one memory 306 and configured to interpret and/or execute program instructions stored in memory 306, and/or read and/or write data stored in memory 306. The program instructions may be included in one or more software modules 308, such as EP &L analysis module 114, EP & L clustering module 116, acoustic or elastic impedance function module 124, optimization module 140, and graphical user interface (GUI) module 322.

The various processors 304 of the information processing system 212 can have different tasks. For example, one or more of software modules 308 can be executed by a different processor 304. These processors 304 and their associated memory 306 can be physically and/or functionally distributed, operating either independently or cooperatively. Physically distributed processors 304 and memories 306 can be located remotely from one another and communicate via a network using wired or wireless communication and can share components, e.g., database 312, I/O interface 314, and/or network adapter 324, or include their own individual components.

Memory 306 may include any system, device, or apparatus configured to hold and/or house one or more memory modules; for example, memory 306 may include read-only memory, random access memory, solid state memory, or disk-based memory. Each memory module may include any system, device or apparatus configured to retain program instructions and/or data for a period of time (e.g., computer-readable non-transitory media). For example, instructions from the respective software modules 308 may be retrieved and stored in memory 306 for execution by one or more of processors 304.

In an embodiment of the present disclosure, data used or generated by the software modules 308, e.g., well log data 112, seismic survey data 122, clustered data 110, input acoustic or elastic impedance arrays 120, modeled data 130, and/or distribution of pseudo-components 180 (see FIG. 1), may be stored in database 312 for temporary or long-term storage. In certain embodiments, the information processing system 212 may further include one or more displays or other input/output peripherals such that information processed by the information processing system 212 can be displayed, such as a GUI for exchanging information with a user. The GUI module 322 can interface with user input devices (e.g., a keyboard, mouse, touchscreen) to receive user input data, and with a display device (e.g., a monitor, display screen, indicator light, etc.) to display data to a user.

Information processing system 212 can further include at least one I/O interface 314, such as a communication port, to enable communication with external devices, e.g., networked devices or peripheral devices (e.g., input and output ("I/O") devices, such as a keyboard, a mouse, and a video display). The information processing system 212 can include a network adapter 324 that facilitates networking between two or more processors 304 and/or between a processor 304 and an external computing device (not shown).

In embodiments, the data received by one or more of the software modules 308 can be simulated data, which can be received, for example, from a simulator, external data center, or library accessible via a storage server.

Modifications, additions, or omissions may be made to FIG. 3 without departing from the scope of the present disclosure. For example, FIG. 3 shows a configuration of components of information processing system 212. However, any suitable configurations of components may be used. For example, components of information processing system 212 may be implemented either as physical or logical components. Furthermore, in some embodiments, functionality associated with components of information processing system 212 may be implemented in special purpose circuits or components. In other embodiments, functionality associated with components of information processing system 212 may be implemented in configurable general purpose circuits or components. For example, components of information processing system 212 may be implemented by configured computer program instructions.

Figure 4:
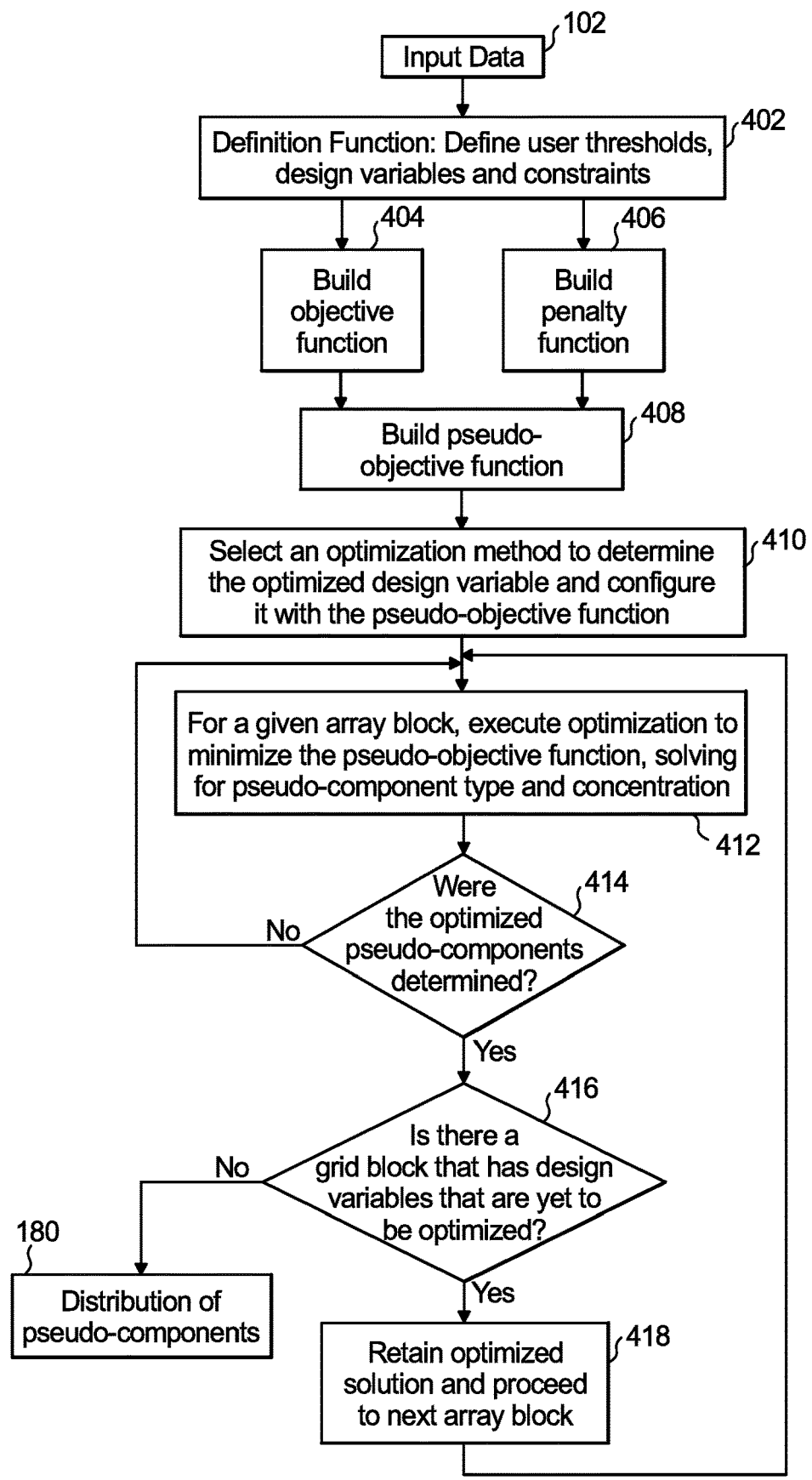
FIG. 4 is a flowchart illustrating an example method performed by an example optimization module of the reservoir modeling system, in accordance with embodiments of the present disclosure.
Figure 5:
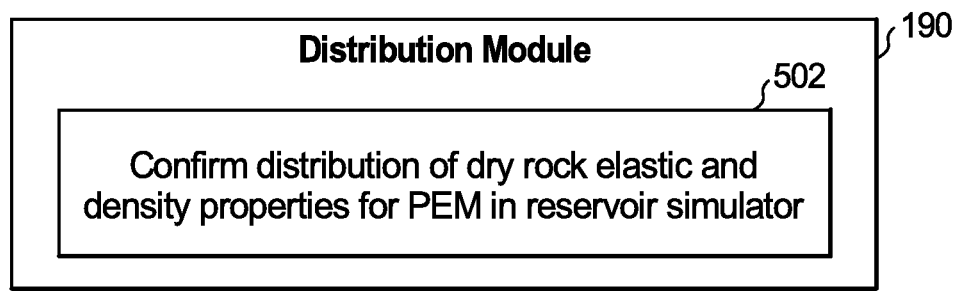
FIG. 5 is a flowchart illustrating an example method performed by an example distribution module of the reservoir modeling system, in accordance with embodiments of the present disclosure.

FIGS. 4 and 5 show flowcharts 400 and 500, respectively, demonstrating implementation of the various exemplary embodiments. It is noted that the order of operations shown in FIGS. 4 and 5 is not required, so in principle, the various operations may be performed out of the illustrated order. Also certain operations may be skipped, different operations may be added or substituted, or selected operations or groups of operations may be performed in a separate application following the embodiments described herein.

The operations shown in FIG. 4 can be performed by the optimization module 140 of the information processing system 212 shown respectively in FIGS. 1 and 3. In particular, a processor 304 of the information processing system 212 may execute the optimization module 140, causing the processor 304 to perform the operations shown in the flowchart 400 and described in the disclosure.

At operation 402, based on the input data, a definition function is performed to define user thresholds, design variables, and constraints. The range in magnitude of the acoustic or elastic impedance arrays 120 combined with the range in petrophysical well log data 112 (gamma ray, neutron density, etc.) can be used to characterize different types of lithologies that exist in the formation in the near-wellbore region. The clustered data 110 is used to classify each lithology into a numerical range values as well as potential spatial distribution. The numerical ranges for each lithology constitute limits that are applied to known design variables and constraints that are associated with the determination of pseudo-components.

The thresholds are computed and oriented, and are specific to the particular optimization process being used (e.g., thresholds may be applied differently in particle swarm optimization (PSO) versus genetic algorithms) The computation of thresholds and constraints has the potential to be automated, but there can still be a degree of flexure that permits users to use their experience to guide the definition of thresholds and constraints. For example, users can use histograms and cross-plots to conduct an analysis for making these determinations.

The constraints can be elastic, density property constraints and/or lithological constraints. An example constraint that can be applied to sandstone is a requirement for density to be in the range of 2.59 g/cc to 2.69 g/cc. If elastic or lithological constraints are not defined, the base optimization process performed at operation 412 becomes unconstrained. Examples of stochastic algorithms that could be applied include a genetic algorithm, Markov Chain Monte Carlo algorithm, a Kalman filtering algorithm, and a Sequential Monte Carlo algorithm.

The optimization process is a closed loop process in which the input data received from different sources (e.g., modules 114, 116, 124 and modeled data sources) are combined in order to ensure a consistent sub-surface description. The design variables selected can have a large numerical range. This is due to the inherent variability in rock properties combined with varied levels of saturation of disparate fluids (e.g., oil, water, gas).

At operation 404, using the design variables, an objective function is built, wherein the objective function is to be optimized based on the defined design variables. The objective function in the current example can be minimization of the L2 Norm estimated and raw impedance data obtained by seismic inversion. At operation 406, a penalty function is built, wherein the penalty function is to be optimized based on the design variables defined. In other words, penalty equations are provided as theoretical and physical descriptions and used as penalties to pseudo-objective function optimization. Rather than use a constrained optimization problem, the method of FIG. 4 uses the penalty function in a series of unconstrained problems whose solutions ideally converge to the solution of an original constrained problem. The constrained problems are formed by adding a term, which is the penalty function, to the objective function, wherein the term consists of a penalty parameter multiplied by a measure of violation of the constraints. The measure of violation is nonzero when the constraints are violated and is zero when the constraints are not violated.

At operation 408, a pseudo-objective function is built by combining the objective function and the pseudo objection function. The pseudo-objective function can be implemented using metaheuristic optimization and a penalty function, such as PSO and external penalty function (EPF), genetic algorithm, Markov chain Monte Carlo Kalman, and sequential Monte Carlo. An example using PSO and EPF is described in Arora, J., Introduction to Optimum Design: Academic Press (2012) and provided as an example, without limitation to a particular technique.

An example pseudo-objective function is provided by Equation (1) and related components by Equations (2)-(13):

The example provides a multidimensional optimization process involving ill-posed elastic property characterization for a geocellular grid array in a reservoir simulator. The implementation of a multidimensional optimization process is applied to higher dimensional space than the first dimension, and furthermore, can be applied to any dimensional space higher than the first dimension. The geocellular grid array can be, for example, a multidimensional model of an underground reservoir rock formation used to approximate the physical structure of the rock formation in space, e.g., 3D space. The geocellular grid array can include a 3D mesh of cells or tessellations that collectively represent a predetermined volume corresponding to the rock formation or relevant portion thereof. The location of each cell within the 3D grid array can correspond to a physical location of the portion of the underground rock formation represented by that cell relative to the formation as a whole. The cells may have equal or varying volumes and shapes, as desired for a particular implementation.

A metaheuristic PSO can be constrained with EPF for multidimensional design variables in the multidimensional pseudo-objective process. An example of a pseudo-objective function is mathematically described in Eq. 1:

$$\Phi(\overline{x},r_p) = F(\overline{x}) + r_p P(\overline{x}) \quad (1)$$

where, $F(\overline{x})$ is an original objective function defined as:

$$F(\overline{x}) = |Z_p^{inv} - Z_p^{opt}| \quad (2)$$

and $r_p$ is a multiplier initialized as a small magnitude numerical value and increases for each solution of $\overline{x}*$ of the pseudo-objective function as it is updated over subsequent iterations. An example EPF is shown in Eq. 3:

$$P(\overline{x}) = \Sigma_{j=1}^{m} \{\max(0,g_j(\overline{x}))\}^2 + \Sigma_{k=1}^{l}(h_k(\overline{x}))^2 \quad (3)$$

The specific problem statement associated with the determination of mineral bulk modulus, shear modulus, and matrix density for three respective 3D geocellular arrays is mathematically described in Eq. 4:

$$\text{Minimize } \Phi(\overline{X},r_p) \quad (4)$$

where $$Z_p^{opt} = \rho_{sat}\sqrt{\frac{K_{sat} + \frac{4}{3}G_{sat}}{\rho_{sat}}} \quad (5)$$

$$G_{sat} = G_{dry} \quad (6)$$

$$\rho_{sat} = (1-\varphi)\rho_{matrix} + \varphi(\rho_w S_w + \rho_o S_o + \rho_g S_g) \quad (7)$$

$$\frac{1}{K_{sat}} = \frac{1}{K_{mineral}} + \frac{\varphi}{K_\varphi + \frac{K_{mineral}K_{fluid}}{K_{mineral} - K_{fluid}}} \quad (8)$$

so that $$g_1(\overline{X}): K_{sat} - \left(\frac{1}{K_{matrix}} + \frac{\varphi}{K_\varphi + \frac{K_{matrix}K_{fluid}}{K_{matrix} - K_{fluid}}}\right) \le 0 \quad (9)$$

$$g_2(\overline{X}): K_{sat} - \rho_{sat}\left(V_p^2 - \frac{4}{3\rho_{sat}}G_{dry}\right) \le 0 \quad (10)$$

$$g_3(\overline{X}): G_{dry} - \rho_{sat}V_s^2 \le 0 \quad (11)$$

$$h_1(\overline{X}): \rho_{matrix} - \left(\Sigma_{i=1}^{4} V_i\rho_i\right) = 0 \quad (12)$$

$$h_2(\overline{X}): K_{matrix} - \frac{1}{2}\left(\Sigma_{i=1}^{4} V_iK_i + \Sigma_{i=1}^{4} V_iK_i^{-1}\right) = 0 \quad (13)$$

The objective function provided in Equation 2 is composed of $Z_p^{inv}$, which is the p-impedance derived by seismic inversion, and $Z_p^{opt}$, which is the optimal solution to an optimized p-impedance constrained by design variables of the EPF. The expression for saturated density $\rho_{sat}$ is shown in Equation 7. It contains terms for the density of water, oil and gas ($\rho_w$, $\rho_o$, $\rho_g$) as well as the fluid saturation for water, oil and gas phases ($S_w$, $S_o$, $S_g$). The $g_1(\overline{X})$ inequality constraint represents the saturated rock bulk modulus. The saturated bulk modulus is represented by $K_{sat}$, and the bulk modulus of the intrinsic mineral of the porous media is $K_{mineral}$, the bulk modulus of the matrix is represented as $K_{matrix}$, which is equivalent to $K_{dry}$. The bulk modulus of the pore space is represented by $K_\varphi$, the porosity is represented by $\varphi$, and $K_{fluid}$ represents the bulk modulus of the pore fluid. The $g_2(\overline{X})$ inequality constraint represents the compressional velocity constraint in the saturated porous media. The compressional velocity is represented by $V_p$, the saturated density is represented by $\rho_{sat}$, and the dry mineral shear modulus is represented by $G_{dry}$, which, under Gassmann assumptions, is equal to the saturated shear modulus represented by $G_{sat}$ in Eq. 6. The $g_3(\overline{X})$ inequality constraint represents the dry mineral shear modulus. The $h_1(\overline{X})$ equality constraint represents the matrix density equation; the pseudo-component volume is represented by $V_i$, and the pseudo-component matrix density is represented by $\rho_i$. The $h_2(\overline{X})$ equality constraint represents the Voigt-Reuss average for the mineral bulk modulus; the pseudo-component mineral bulk modulus is represented by $K_i$. An optimal solution for 3D geocellular arrays for pseudo-components of $V_i$, $K_i$, and $\rho_i$ can then be determined by the combined PSO and EPF scheme by considering reference values for $K_{matrix}$, $G_{dry}$, and $\rho_{matrix}$, given an assumed geologic description.

It can be observed that the original objective function represents an L2 Norm of the p-impedance, computed by seismic inversion, and the p-impedance estimated by the combination of PSO and EPF. EPF is considered a type of sequential unconstrained minimization technique (SUMT) that has equality and inequality constraint equations included as a part of the pseudo-unconstrained objective function. This provides a penalty method, however the disclosure is not limited to this penalty method. Another penalty method, such as an interior penalty function (IPF) can be used, however the IPF may add complexity relative to the above penalty method since boundary definitions do not require maintenance during execution of the optimization process. An example PSO that can be used to address the unconstrained pseudo-objective function is variable neighborhood PSO, however the disclosure is not limited to this PSO. In examples, Haupt et al., Practical Genetic Algorithms, 2nd ed., John Wiley & Sons, pp. 189-90 (2004) an example variable neighborhood search (VNS) is described, and in Abraham et al., Variable Neighborhood Particle Swarm Optimization Algorithm, GECCO (2006) an example type of metaheuristic is described.

At operation 410, an optimization method is selected to determine the optimized design variable and configure it with the pseudo-objective function. The optimization method can be selected, for example, based on factors such as method performance, accuracy or desired end product. The optimization algorithm can be, for example, a particle swarm optimization, or another meta-heuristic optimization technique, that can be used to minimize a difference between calculated acoustic or elastic impedance and impedance obtained by seismic inversion. As is known to one skilled in the art, the pseudo-objective function is an equation, the design variables are variables in the pseudo-objective function, and the optimized design variables are iteratively evaluated in the pseudo-objective function using the selected optimization method.

At operation 412, for a given array block, the selected optimization method is executed to minimize the pseudo-objective function, solving for pseudo-component type and concentration. The concentration refers to a combination of pseudo-components in a spatially defined area that are included in an estimated lithological description. The optimized pseudo-component type and concentration occurs when the correct combination of pseudo-components leads to matching of estimated impedance with the impedance obtained from seismic inversion. The ability of the optimization method to sufficiently predict impedance in a constrained stochastic design space compared to the impedance from the seismic inversion can be judged by how similar the estimation is to the actual seismic inversion result, wherein the acoustic or elastic impedances are the result of seismic inversion performed by module 124.

The output of the pseudo-components provides a characterization of volumetric concentration of lithologies in a control volume of the reservoir, providing a picture of elastic properties of frame rock throughout the reservoir. The rock frame is dry rock material without any fluid. This includes the different minerals that are included in the rock. Volumetric concentration refers to a design variable which is optimized by the optimization method.

At operation 414, a determination is made whether the optimized pseudo-components were determined. The criteria for the determination at operation 414 are the user defined thresholds provided by the user in block 402. The user may relax or stiffen these process specific thresholds based on discretion. If the determination at operation 414 is NO, meaning the optimized pseudo-components were not yet determined, an iterative process of determining the optimized pseudo-components is continued at operation 412. If the determination at operation 414 is YES, meaning the optimized pseudo-components were determined, the iterative process of determining the optimized pseudo-components is completed, and the method continues at operation 416.

At operation 416, a determination is made whether all of the input acoustic or elastic impedance arrays have been processed by determining whether there still exists a grid block that has design variables that are yet to be optimized. If the determination at operation 416 was NO, meaning that there remain further impedance arrays to process, then the method continues at operation 418. At operation 418, select the next array block, and provide the optimized solution determined by the final iteration of operation 412 for the previous block for continuing the method at operation 412 for the selected array block.

If the determination at operation 416 was YES, meaning that there do not remain further impedance arrays to process, then the method outputs the distribution of pseudo-components that were solved during the last iteration of operation 412 performed. The output can be one or more single-dimensional arrays of pseudo-components (e.g., expressed as integers) or elastic and/or densities properties (which can be expressed similarly to entries in a 3-D grid), respectively, depending on user preference. The method shown in FIG. 4 is different than each of: using empirical correlations between known and unknown properties, experiential inference, iterative ensemble methods, or workflow negation due to a lack of, or limits of, available data.

Rather, this method, by applying elastic constraints, uses deterministic elastic property references to accelerate optimization routines. The constraints are lithological and elastic property related, with the elastic property constraints being numerical and providing a basis for lithological classification.

The optimization routines are accelerated by referencing the lithological constraints to form pseudo-components. The pseudo-components represent an enhanced estimation of the existing lithology in a spatial location.

The method shown in FIG. 4 further represents the use of optimization to solve for optimized pseudo-components and obtain a 3D solution, in particular a grid block volume in a 3D model. The results are simple and intuitive, without representing heterogeneity that exists in the actual subsurface, which can be extraneous information in certain applications. This is different than the use of assumptions and/or substitutions driven by a user, skilled in the art. This is further different than a result that is a model characterized by properties obtained by educated guess or retrieval from literature.

This method is characterized as "data-driven" as, advantageously, it uses available information to stochastically infer desired information under high degrees of uncertainty.

In a scenario in which there is an absence of well log data, this method uses optimization to solve for porosity and/or other pseudo components to optimize the design variable that would otherwise have been characterized by log data. For example, using the optimization constrained by physical equations in accordance with the disclosure, independent dry rock properties can be characterized in earth modeling, whether or not saturated rock property logs are available. In another example, the optimization method can be used to determine a porosity distribution of a model in addition to the pseudo-components. The optimization method can further be executed with seismic data only, such as to minimize the pseudo-objective function based on unconstrained optimization.

The method can use physics constrained modeling. The physics constrained modeling is deterministic as it follows physicals laws and is repeatable. In embodiments, the physics based constraints used are equality and inequality constraints that are included in the penalty function associated with the pseudo-objective function. In embodiments, other physics based constraint equations can be added in order to compute other elastic (e.g., Lame parameters, Young's modulus, P-wave modulus) and petrophysical properties (e.g., permeability).

The disclosure can be utilized in reverse engineering applications that require N-dimensional solution in the presence of N-dimensional design variables. For example, one or more unknown design variables can be optimized in the presence of known design variables. For instance, an input variable, e.g., porosity, can be omitted and solved for using known design variables.

In accordance with the method shown in FIG. 4, an alternative workflow can be applied to the pseudo-objective function when using the disclosed method. The alternative workflow represents application of a magnitude specific adaptive weighting scheme. In this scheme, a penalty correction term in the pseudo-objective function is provided so that each penalty function is weighted according to the magnitude of the magnitude of its result. In this way, large and small magnitude penalties can be equally weighted. This differs from methods in which the same penalty correction term is applied to every penalty function regardless of result magnitude.

FIG. 5 shows one example of many possible ways in which the pseudo-components output by the optimization module 140 can be applied. Other examples include predicting changes in elastic properties of the reservoir as a result of production or injection of water or gas. The operations shown in FIG. 5 can be performed by the distribution module 190 of the information processing system 212 shown in FIGS. 1 and 3. In particular, a processor 304 of the information processing system 212 may execute the distribution module 190, causing the processor 304 to perform the operations shown in the flowchart 500 and described in the disclosure.

At operation 502, the dry rock elastic and density properties are confirmed based on the determined pseudo-components. The results are then incorporated into a petro-elastic model (PEM), such as those which are embedded or associated with a reservoir simulator as a post-process so that dynamic elastic properties may be simulated. The results of the simulation may then be used to guide the identification of potential bypass pay which in turn will enable the planning of well locations and well design.

The potential bypass pay represents hydrocarbons which have remained in place and not been produced in a region of the reservoir which has been previously and/or is currently being produced. The word "potential" is used here since confirmation of bypass pay is performed by analyzing time-lapse seismic data in the same region of interest. Potential bypass pay is not directly related to the pseudo-components. However, the pseudo-components are used to confirm assumed dry elastic and density properties distributions, which in turn are included in a PEM that is incorporated into a flow simulation. The flow simulation allows for the estimation of dynamic elastic properties which facilitate the planning of future wells based on identified potential bypass pay.

For example, the pseudo-components output by the optimization module 140 can be used to confirm dry rock and density properties then applied to an embedded PEM, such as Nexus® to facilitate integrated earth modelling and reservoir simulation workflows in integrated 4D seismic to simulation workflows.

Accordingly, the disclosed system and methods, by performing a meta-heuristic optimization using lithological, petrophysical, and elastic constraints, provide the ability to characterize volumetric concentrations of pseudo-components and then confirm assumed dry rock and density properties in a subterranean formation.

In accordance with aspects of the disclosure, a vertical seismic profiling (VSP) system for characterizing a subterranean formation, the VSP system having an information processing system therein. The VSP system comprises a plurality of seismic sources arranged on a surface of the subterranean formation in a configuration optimized to create seismic waves in the subterranean formation and a sonde sensing instrument disposed in the subterranean formation and configured to receive the seismic waves from the formation, the sonde sensing instrument communicatively coupled to the information processing system. The information processing system having a processor and a memory device coupled to the processor is provided. The memory device includes a set of instruction that, when executed by the processor, cause the processor to receive a multi-dimensional grid of acoustic or elastic impedances determined from seismic survey data associated with a subterranean formation, receive elastic property data that describes elastic property characteristics used to sort pseudo-components, wherein the respective pseudo-components are formed of a combination of two or more lithologies. The instructions, when executed by the processor, further cause the processor to define a design variable using the impedances, perform optimization operations for optimizing the design variable by applying the elastic property data as one or more constraints, and output a distribution of the pseudo-components to characterize volumetric concentrations of lithologies in a control volume of the subterranean formation.

In embodiments, the optimization operations can be meta-heuristic optimization operations. The meta-heuristic optimization operations can be particle swarm optimization operations. When the elastic property characteristics are unavailable, the optimization operations can be completely stochastic.

In embodiments, the elastic property characteristics can be determined from well log data associated with the subterranean formation. The elastic property characteristics can be determined from sonic log data of well log data associated with the subterranean formation.

In further embodiments, the set of instruction, when executed by the processor, can further cause the processor to optimize at least one of well location and well design based on the distribution of the pseudo-components.

In accordance with aspects of the disclosure, a method of conducting distributed acoustic sensing (DAS) using vertical seismic profiling (VSP) in a subterranean formation is provided that includes creating seismic waves in the subterranean formation using a plurality of seismic sources arranged on a surface of the subterranean formation in a configuration optimized to create the seismic waves. The method further includes processing the seismic waves at an information processing system to generate seismic survey data associated with the subterranean formation and receiving a multi-dimensional grid of acoustic or elastic impedances determined from the seismic survey data associated with the subterranean formation and receiving elastic property data that describes elastic property characteristics used to sort pseudo-components. The respective pseudo-components are formed of a combination of two or more lithologies. The method further includes defining a design variable using the impedances, performing optimization operations for optimizing the design variable by applying the elastic property data as one or more constraints, and outputting a distribution of the pseudo-components to characterize volumetric concentrations of lithologies in a control volume of the subterranean formation.

In embodiments, the method includes applying seismic energy to the subterranean formation using the plurality of seismic sources to create the seismic waves, receiving reflected, applied seismic energy at a sonde sensing instrument communicatively coupled to the information processing system, and outputting the seismic survey data by the information processing system based on the received, reflected, applied seismic energy.

In embodiments, the method further includes receiving well log data based on measurements of characteristics that arise from natural or induced phenomena, analyzing the well log data to determine the elastic property characteristics, and clustering the well log data based on the elastic property characteristics into pseudo-components.

In further embodiments, the method further includes optimizing at least one of well location and well design based on the distribution of the pseudo-components.

Additionally, in embodiments, the method further includes inducing a phenomena in a wellbore formed in the subterranean formation, and obtaining the well log data based on measurements of characteristics arising from the induced phenomena. The well log data received can be sonic log data.

In embodiments, the optimization operations can be meta-heuristic optimization operations. The meta-heuristic optimization operations can be particle swarm optimization operations.

In embodiments, when the elastic property characteristics are unavailable, performing the optimization stochastically.

In aspects of the disclosure, an optimization system is provided that includes at least one energy source, each configured to apply seismic energy to a subterranean formation in the vicinity of a wellbore, and at least one receiver being at least partially positioned within the wellbore for receiving reflected, applied seismic energy and outputting seismic survey data based on the received, reflected, applied seismic energy.

The optimization system further includes an information processing system that includes a processor and a memory device coupled to the processor. The memory device includes a set of instructions that, when executed by the processor, cause the processor to receive a multi-dimensional grid of acoustic or elastic impedances determined from the seismic survey data associated with the subterranean formation and receive elastic property data that describes elastic property characteristics used to sort pseudo-components. The respective pseudo-components are formed of a combination of two or more lithologies. The instructions, when executed by the processor, further cause the processor to define a design variable using the impedances, perform optimization operations for optimizing the design variable by applying the elastic property data as one or more constraints, and output a distribution of the pseudo-components to characterize volumetric concentrations of lithologies in a control volume of the subterranean formation.

In embodiments, the optimization operations can be meta-heuristic optimization operations. The meta-heuristic optimization operations can be particle swarm optimization operations. The elastic property characteristics can be determined from well log data associated with the subterranean formation.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the disclosed embodiments as defined in the appended claims.

What is claimed is:

1. A vertical seismic profiling (VSP) system for characterizing a subterranean formation, the VSP system having an information processing system therein, comprising:
   a plurality of seismic sources arranged on a surface of the subterranean formation in a configuration optimized to create seismic waves in the subterranean formation;
   a sonde sensing instrument disposed in the subterranean formation and configured to receive the seismic waves from the subterranean formation, the sonde sensing instrument communicatively coupled to the information processing system, the information processing system comprising:
   a processor; and
   a memory device coupled to the processor, the memory device having a set of instructions that, when executed by the processor, cause the processor to:
   receive a multi-dimensional grid of acoustic or elastic impedances determined from seismic survey data associated with a subterranean formation;
   receive elastic property data that describes elastic property characteristics used to sort pseudo-components, wherein the respective pseudo-components are formed of a combination of two or more lithologies clustered based on the elastic property characteristics of the respective pseudo-components;
   receive modeled data obtained from at least one of actual samples of the subterranean formation, well logs associated with the subterranean formation, and representative estimations of properties of the subterranean formation based on reference values;
   define a design variable using the acoustic or elastic impedances and the modeled data;
   perform optimization operations for optimizing the design variable by applying the elastic property data as one or more constraints; and
   output a distribution of the pseudo-components to characterize volumetric concentrations of lithologies in a control volume of the subterranean formation.

2. The system of claim 1, wherein the optimization operations are meta-heuristic optimization operations.

3. The system of claim 2, wherein the meta-heuristic optimization operations are particle swarm optimization operations.

4. The system of claim 1, wherein when the elastic property characteristics are unavailable, the optimization operations are stochastic.

5. The system of claim 1, wherein the elastic property characteristics are determined from well log data associated with the subterranean formation.

6. The system of claim 1, wherein the elastic property characteristics are determined from sonic log data of well log data associated with the subterranean formation.

7. The system of claim 1, wherein the set of instructions, when executed by the processor, further cause the processor to optimize at least one of well location and well design based on the distribution of the pseudo-components.

8. A method of conducting distributed acoustic sensing (DAS) using vertical seismic profiling (VSP) in a subterranean formation, comprising:
   creating seismic waves in the subterranean formation using a plurality of seismic sources arranged on a surface of the subterranean formation in a configuration optimized to create the seismic waves;
   processing the seismic waves at an information processing system to generate seismic survey data associated with the subterranean formation;
   receiving a multi-dimensional grid of acoustic or elastic impedances determined from the seismic survey data associated with the subterranean formation;
   receiving elastic property data that describes elastic property characteristics used to sort pseudo-components, wherein the respective pseudo-components are formed of a combination of two or more lithologies clustered based on the elastic property characteristics of the respective pseudo-components;
   receiving modeled data obtained from at least one of actual samples of the subterranean formation, well logs associated with the subterranean formation, and representative estimations of properties of the subterranean formation based on reference values;
   defining a design variable using the acoustic or elastic impedances and the modeled data;
   performing optimization operations for optimizing the design variable by applying the elastic property data as one or more constraints; and
   outputting a distribution of the pseudo-components to characterize volumetric concentrations of lithologies in a control volume of the subterranean formation.

9. The method of claim 8, further comprising:
   applying seismic energy to the subterranean formation using the plurality of seismic sources to create the seismic waves;

receiving reflected, applied seismic energy at a sonde sensing instrument communicatively coupled to the information processing system; and outputting the seismic survey data by the information processing system based on the received, reflected, applied seismic energy.

10. The method of claim 8, further comprising:

receiving well log data based on measurements of characteristics that arise from natural or induced phenomena;

analyzing the well log data to determine the elastic property characteristics; and clustering the well log data based on the elastic property characteristics into pseudo-components.

11. The method of claim 8, further comprising optimizing at least one of well location and well design based on the distribution of the pseudo-components.

12. The method of claim 8, further comprising:

inducing one or more phenomena in a wellbore formed in the subterranean formation; and obtaining well log data based on measurements of characteristics arising from the induced one or more phenomena.

13. The method of claim 8, wherein well log data received is sonic log data.

14. The method of claim 8, wherein the optimization operations are meta-heuristic optimization operations.

15. The method of claim 14, wherein the meta-heuristic optimization operations are particle swarm optimization operations.

16. The method of claim 8, wherein when the elastic property characteristics are unavailable, performing the optimization operations stochastically.

17. An optimization system, the optimization system comprising:

at least one energy source, each configured to apply seismic energy to a subterranean formation in a vicinity of a wellbore;

at least one receiver being at least partially positioned within the wellbore for receiving reflected, applied seismic energy and outputting seismic survey data based on the received, reflected, applied seismic energy;

an information processing system including a processor and a memory device coupled to the processor, the memory device having a set of instructions that, when executed by the processor, cause the processor to:

receive a multi-dimensional grid of acoustic or elastic impedances determined from the seismic survey data associated with the subterranean formation;

receive elastic property data that describes elastic property characteristics used to sort pseudo-components, wherein the respective pseudo-components are formed of a combination of two or more lithologies clustered based on the elastic property characteristics of the respective pseudo-components;

receive modeled data obtained from at least one of actual samples of the subterranean formation, well logs associated with the subterranean formation, and representative estimations of properties of the subterranean formation based on reference values;

define a design variable using the acoustic or elastic impedances and the modeled data;

perform optimization operations for optimizing the design variable by applying the elastic property data as one or more constraints; and output a distribution of the pseudo-components to characterize volumetric concentrations of lithologies in a control volume of the subterranean formation.

18. The optimization system of claim 17, wherein the optimization operations are meta-heuristic optimization operations.

19. The optimization system of claim 18, wherein the meta-heuristic optimization operations are particle swarm optimization operations.

20. The optimization system of claim 17, wherein the elastic property characteristics are determined from well log data associated with the subterranean formation.

* * * * *